(12) United States Patent
Kodama

(10) Patent No.: US 7,035,875 B2
(45) Date of Patent: Apr. 25, 2006

(54) METHOD OF USING MULTI-MEDIA INFORMATION, SYSTEM AND PROGRAM RECORDING MEDIUM THEREFOR

(75) Inventor: Mei Kodama, Hiroshima (JP)

(73) Assignee: Japan Science and Technology Corporation, Saitama (JP)

(*) Notice: Subject to any disclaimer, the term of this patent is extended or adjusted under 35 U.S.C. 154(b) by 486 days.

(21) Appl. No.: 10/296,224

(22) PCT Filed: Jun. 1, 2001

(86) PCT No.: PCT/JP01/04674

§ 371 (c)(1),
(2), (4) Date: Jan. 29, 2003

(87) PCT Pub. No.: WO01/95150

PCT Pub. Date: Dec. 13, 2001

(65) Prior Publication Data

US 2003/0126123 A1    Jul. 3, 2003

(30) Foreign Application Priority Data

Jun. 6, 2000    (JP) ............................. 2000-169459

(51) Int. Cl.
*G06F 17/30* (2006.01)
(52) U.S. Cl. .................................. 707/104.1
(58) Field of Classification Search ............ 707/101, 707/104.1
See application file for complete search history.

(56) References Cited

U.S. PATENT DOCUMENTS

| | | | | |
|---|---|---|---|---|
| 6,055,566 A | * | 4/2000 | Kikinis | 709/219 |
| 6,314,466 B1 | * | 11/2001 | Agarwal et al. | 709/231 |
| 6,388,957 B1 | * | 5/2002 | Yankowski | 369/30.06 |
| 6,581,103 B1 | * | 6/2003 | Dengler | 709/231 |
| 6,671,807 B1 | * | 12/2003 | Jaisimha et al. | 713/193 |

(Continued)

FOREIGN PATENT DOCUMENTS

JP    09-026965    1/1997

OTHER PUBLICATIONS

Akira Kodama et al., "MSP Gazou Kensaku System ni okeru Shoriryo no Kousatsu," 2000 nen Denshi Joho Tsushin Gakkai Sogo Taikai, D-11-86, Mar. 28, 2000, p. 86.

(Continued)

*Primary Examiner*—Jeffrey Gaffin
*Assistant Examiner*—Haythim Alaubaidi
(74) *Attorney, Agent, or Firm*—Neifeld IP Law, PC

(57) ABSTRACT

Multi-media (MM) information are flexibly reproduced, edited, processed and re-transmitted in conformity with users' needs. A plurality of elements of MM information are distributed, stored and used via a control terminal (4) for distributing and controlling information between a transmission terminal (1) and a reception terminal (2). MM information are stored in a package and distributed. MM information has container information for identifying MM information as one unit, content information constituted of media information itself, and behavior information for manipulating content information. MM information are accumulated and distributed after being compressed, and used after being developed (decompressed). A user obtains (111) an MM information list from a reception terminal (2) after going through user registration confirmation and user service confirmation (101–109) by means of a transmission terminal (1) and a control terminal (4), makes retrieval or edit/process request (113) using the obtained MM information, and, if a usage qualification condition is met (115–125), receives (129) MM information from a transmission terminal (1) to complete processing (131, 133).

24 Claims, 12 Drawing Sheets

U.S. PATENT DOCUMENTS 6,731,312 B1 *  5/2004  Robbin ........................ 715/792

OTHER PUBLICATIONS

Noburo Taniguchi et al., "Multimedia Joho Base to sono Kakuno Tan-i: Matryoshka," Joho Shori Gakkai Symposium Series, vol. 99, No. 7, Multimedia, Busan, Kyouchuu to Mobile (DICOMO '99), Symposium Ronbunshuu, (Jun. 30, 1999), pp. 207-212.

Yoshimi Isu et al., "XML Kijutsu o mochiiru Contents Kensaku Jikken System no Kouchiku," 1999 nen Denshi Joho Tsushin Gakkai Joho, System Society Taikai Kouen Ronbunshuu, (Sep. 7, 1999), p. 132, Fig. 1.

Mitsuhiro Yuhito et al., "Multimedia Joho Kyoyuu System Kouseijou no Kento," Denshi Joho Tsushin Gakkai Gijutsu Kenkyu Houkokusho, vol. 94, No. 472 (IN94-142), (Jan. 27, 1995), pp. 37-42, especially p. 39, Fig. 3: p. 41, Figs. 3, 4.

Hiroyuki Kasai et al., "Multimedia Proceeding Package no Saihenshuu Shori ni kansuru Kentou," Denshi Joho Tsushin Gakkai Gijutsu Kenkyu Houkokusho, vol. 96, No. 496 (IN96-123), (Jan. 24, 1997), pp. 107-114, Figs. 2, 6.

Hideyoshi Tominaga, "Jisedai Tsushin Kiban to sono Ouyou; Joho Reizouko System ni tsuite," Gazou Denshi Gakkaishi, vol. 27, No. 5; (Oct. 25, 1998), pp. 452-465.

Mei Kodama et al., "A Consideration on Video Information Architectures for Multimedia Scalability Packages Communication Services," The Institute of Electronics, Information and Communication Engineers, Technical Report of the IEICS, OFS98-40, IE98-66(Sep. 1998), pp. 47-52).

Hiroyuki Kasai et al., "A Study on Playing and Editing Processing of Video Information Based on the Multimedia Scalability Package Structure," CMN-98-67, pp. 53-58.

Mei Kodama, "A Consideration of Information Structures of Multimedia Proceedings Packages using the Scalability Architectures," The Institute of Electronics, Information and Communication Engineers, Technical Report of IEICE, IE98-38, PRMU98-61, MV98-61 (Jul. 1998); pp. 63-69.

Mei Kodama, "A Study on the MSP Searching System," The Institute of Electronics, Information and Communication Engineers, Technical Report of IEICE (6 pages).

Technology Interface, vol. 4, 2000, pp. 34-61.

Masako Morishita et al., User Kankyo ni ojita Contents Haishin Seigyo Houshiki no Kentou, 2000 nen Denshi Joho Tsushin Gakkai Sogo Taikai B-7-110, (Mar. 28, 2000), p. 203.

Mei Kodama et al. "A Study on the Hybrid Image Coding and Structuring Methods for Multimedia Scalability Packages Communication Services," Multimedia Computing and Systems, vol. 2 IEEE International Conference on Jun. 7-11, 1999, pp. 92-96.

Hiroyuki Kasai et al., "A Study on Playing and Editing Processing of Video Information based on the Multimedia Scalability Package Structure," The Institute of Electronics Information and Communication Engineers, Technical Report of IEICE, OFS98-41, IE98-67 (Sep. 1998), pp. 53-58.

Mei Kodama, "A Study of the Description Methods on the MSP Searching Systemn Playing and Editing Processing of Video Information based on the Multimedia Scalability Package Structure," The Institute of Electronics, Information and Communication Engineers Technical Report of IEICE, OFS99-67 (Mar. 2000), pp. 1-6.

Masako Morishita et al., "Contents Delivery Control Adaptive to User Environment," Proceedings of the 2000 IEICE General Conference, Mar. 28-31, 2000, Hiroshima University, Higashi-Hiroshima, p. 203.

* cited by examiner

| CATEGORIES | OUTLINES | USED FUNCTION | | | | | MM INFORMATION | | | REMARKS |
|---|---|---|---|---|---|---|---|---|---|---|
| | | SEARCH | S? | EDIT | SUMMARIZE | OTHERS | CONTAINER | CONTENT | BEHAVIOR | |
| ERECTRONIC LIBRARY | Many pieces of multimedia information are stored. A user selects and uses desired information. | ○ | | | | | ○ | | | FIRST EMBODIMENT |
| ARTICLE SERVICE | Processing is performed automatically based on days passed from a date when searched and transferred MM information is transferred. | | ○ | | ○ | ○ | ○ | | ○ | SECOND EMBODIMENT |
| COMMUNICATION | MM information is exchanged among multiple users. | ○ | | ○ | ○ | | | ○ | | THIRD EMBODIMENT |
| EDITING | New MM information is created or edited. | ○ | | ○ | ○ | | | | ○ | THIRD EMBODIMENT |
| PRESENTATION | Report or presentation is performed in a conference by using MM information. | | | | ○ | | ○ | ○ | | FOURTH EMBODIMENT |
| INFORMATION SUPPLY | Present MM information is introduced to other MM systems | | | | | ○ | | | | FIRST EMBODIMENT |
| REMOTE CONTROL | | | | | | | | | | |

| MM PACKAGE (MMP) | | | |
|---|---|---|---|
| CONTAINER INFORMATION HEADING INFORMATION | CONTENT INFORMATION | | BEHAVIOR INFORMATION |
| | TEXT INFORMATION | STILL IMAGE INFORMATION | |

(b)

| MM PACKAGE (MMP) | | |
|---|---|---|
| CONTAINER INFORMATION HEADING INFORMATION | CONTENT INFORMATION | BEHAVIOR INFORMATION |
| | TEXT INFORMATION | |

(c)

| MM PACKAGE (MMP) | |
|---|---|
| CONTAINER INFORMATION HEADING INFORMATION | BEHAVIOR INFORMATION |

FIG. 8

METHOD OF USING MULTI-MEDIA INFORMATION, SYSTEM AND PROGRAM RECORDING MEDIUM THEREFOR

FIELD OF THE INVENTION

The present invention relates to a method of using multimedia (MM) information, a recording medium storing a program of using multimedia information and a multimedia information system. In particular, the present invention relates to a method of using multimedia information for transferring, storing and searching multimedia information, which is excellent in usability, a recording medium storing a program of using a multimedia information and a multimedia information system.

BACKGROUND OF THE INVENTION

Recently, the usability of multimedia information has gathered attentions for handing a plurality of media information such as moving pictures, sound, and text.

A first conventional technology may be a television telephone system. The television (TV) telephone system is a system for connecting voice information through a telephone and image information through a TV bidirectionally. The TV telephone system cannot send a large amount of information since the transfer speed of the line is limited. Therefore, multimedia (MM) information in high quality cannot be exchanged. In addition, the communication information is lost on the spot, and the information generally cannot be stored and/or be reused.

A second conventional technology may be a digital video disk (DVD) system in addition to a conventional technology example for providing reusable MM information in high quality. FIG. 12 is a diagram for explaining the digital video disk system.

In the DVD system, an original image (moving image) is structured hierarchically and is compressed by an encoder. Voice is also encoded by the encoder. Synchronous signals of the image and the voice are written in an optical disk along with the respective data. A user reconstructs the encoded data stored in the optical disk by using a decoder so that high level MM information can be reconstruct, which is close to the original image and/or the original voice. The methods of encoding and decoding are standardized as MPEG-2, for example. Thus, the user can reuse the provided MM information by using a terminal apparatus including MPEG-2 decoder repeatedly whenever the user desires.

The DVD uses the optical disk as a storage medium for MM information. Therefore, a large amount of information can be distributed easily. However, a fast transmission circuit is required for handling such a large amount of information in a distribution system. Thus, a private line such as satellite broadcasting is required. In other words, when a shared distribution system is used which is generally available presently, the reusable MM information in high quality is difficult to use.

A third conventional technology may be a video letter, which is a system for transferring similar MM information as the sharable distribution system. The video letter packaged transmits compressed image/voice information by using a shared line and decodes the information in the receiver side for use. However, the video letter system is responsible for information communication in one direction from the sender side to the receiver side. Therefore, even when the incoming information can be transferred to another party directly, the information content cannot be reprocessed, which lacks convenience in using MM information.

In order to establish MM information, which can reuse MM information and can transfer it by using a shared transmission line and which is excellence in convenience for use, the data structure of transferred/stored MM information is important. The data structures in conventional technologies are as follows.

A fourth conventional technology may be an object-based MM data structure. The data structure divides MM information into small units (objects), which are hierarchically structured and is stored for being used by a user. The user uses the MM information by expanding it from the high level in the hierarchy information and obtaining a required amount of information toward the low level. For example, the object-based MM data structure includes a background, a foreground human character, a desk and a chair in computer graphics.

A fifth conventional technology has been proposed for constructing MM information by content information and behavior information and transferring the MM information as package information including them according to Multimedia and Hypermedia information coding Expert Group (MHEG). The MHEG data structure can conveniently provide a function for reconstructing received data automatically in the receiver side by writing an automatically reconstructing function in the behavior information.

SUMMARY OF THE INVENTION

However, information is divided into small units in the object-based data structure of the fourth conventional technology. Therefore, the outline of the entire MM information is difficult to grasp externally. In addition, the outline of the entire information is difficult to grasp in a speed desired by the user. In other words, even when the data structure can be reused partially, each of the objects is provided for each component. Therefore, the user must determine whether or not each of the small components is reused. Thus, this is a problem for the user's convenience in that a large amount of entire MM information is difficult to view briefly.

The data structure of the fifth conventional technology is limited in automatic reconstruction, which limits handling of MM information in accordance with an intention of the user. In other words, MM information is uniquely reconstructed by the behavior information. Therefore, flexible usage is difficult such as changing a form of representing MM information in accordance with the determination by the received user. In addition, an intention of a sending user for reconstruction is not given when transferring MM information (that is, the reconstruction requirement cannot be controlled).

In view of these problems, it is an object of the present invention to provide a method of using multimedia information, a recording medium storing a program of using multimedia information and a multimedia information system. In this case, MM information in high quality can be transferred by using a shared transfer system and can be reconstructed, edited, processed and/or re-transferred flexibly in accordance with the convenience of a user.

With respect to (1) multimedia and (2) the data structure, for example, the present invention can have feature as follows:

(1) Regarding multimedia;

The present invention is a multimedia (abbreviated as MM hereinafter) information system in which a plurality of media information (such as an image, voice and a document)

can be transferred, stored and/or used by using a common digital medium between at least one sending terminal and at least one receiving terminal.

(2) Regarding data structure;

(2.1) Packaging

MM information is divided into a plurality of unit information having a meaning in uses as a bundle of information, which is stored and is transferred.

(2.2) The present invention may have a management terminal commonly connected to all of sending and receiving terminals.

(2.3) Data Compression

MM information may be compressed, stored, transferred and expanded for use.

(2.4) Construction

MM information may include an information group having:

"container information" to be used for identifying one piece of MM information;

"Content information" including media information itself; and

"Behavior information" to be used for manipulating content information.

The MM structure is further characterized in:

(3) The "Container information":

(3.1) has brief information describing an outline of the content information and the behavior information (corresponding to the most highest hierarchy including the content information and the behavior information); and (3.2) can include copyright information and usage information for each person.

(4) The "Content information":

(4.1) can be independent information, which is created by using a part of at least one piece of media information and be used independently;

(4.2) can be scalable in that the content information can be functionally divided, stored and transferred into independent information created by using a part of at least one piece of media information and be used independently and at least one piece of additional information added to the independent information to become closer to original medium information; and (4.3) can have a plurality of container information (including container information and behavior information typified by that).

(5) The "Behavior information":

(5.1) can have information for manipulating (reconstructing, searching, editing and/or processing) content information, which is set by a user;

(5.2) can include history information of manipulations performed by a user in past; and (5.3) can include information regarding a behavior in a receiver side, which is set by a sender.

Operationally in the present invention:

(1) data can be packaged, stored and transferred so that data can be stored in package in a receiver side and can be handled in package independently for use;

(2) content information is constructed by minimum meaningful units, and data can be added, discarded and/or replaced (processable), wherein:

(2.1) Content information in the standardized data format can be edited easily;

(2.2) An outline content information can be always grasped from container information because container information is added to the content information and the container information is rewritten (the outline is written) when editing content information;

(2.3) When a plurality of content information are provided in the low level of the content information, the highest content information and the lower content information, the content information in a low level and the higher content information can be associated; and (2.4) Since behavior information is added to content information, the handling of content information can be controlled by rewriting behavior information (remote control), (3) Container information includes an outline of content information so that the content information can be searched based on the outline;

(4) Content information is functionally divided (scalable) so that only independent information can be used and the independent information can allow browsing (preliminary examination of entire container information);

(5) Container information can include copyright information so that inquiring to a right holder for permission based on the copyright information, which can achieve a copyright protection function;

(6) Container information can include personal usage information and content information can be packaged, which can achieve a bookmark function by adding a positional mark for content information in use to the container information; and (7) history information of manipulations performed by a user in past can be included so that automatic information reconstruction can be performed based on the past manipulation history.

BRIEF DESCRIPTION OF THE DRAWINGS

FIG. 4 is an explanatory diagram of an example in which a data structure (MMP) according to the present invention is applied to a multimedia service;

FIG. 8 is an explanatory diagram showing a construction of an MM package for the article service;

DETAILED DESCRIPTION OF THE PREFERRED EMBODIMENTS (1) System Configuration

Figure 1:
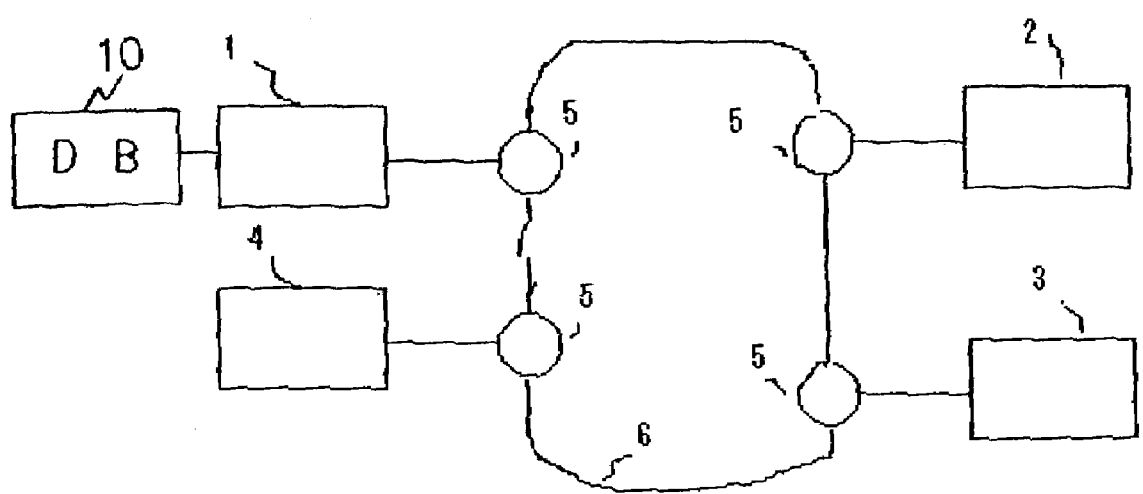
FIG. 1 is a configuration diagram of an MM information system according to the present invention.

FIG. 1 is a configuration diagram of an MM information system according to the present invention.

The shown system includes a sending terminal 1, receiving terminals 2 and 3, a management terminal 4, a transfer device 5, and a transfer system 6.

In this embodiment, multiple pieces of MM information are stored in a database 10 of the sending terminal 1. A user can extract desired MM information from the receiving terminal 2 or 3 for use. Here, the MM information desired by the user is sent/received through the transfer device 5 and the transfer system 6. The transfer system 6 may be a network such as a publicly switched network, a satellite network, a mobile apparatus network, the Internet, an optical fiber network, a radio network and a infrared ray network. The management terminal 4 manages information transfer.

Figure 2:
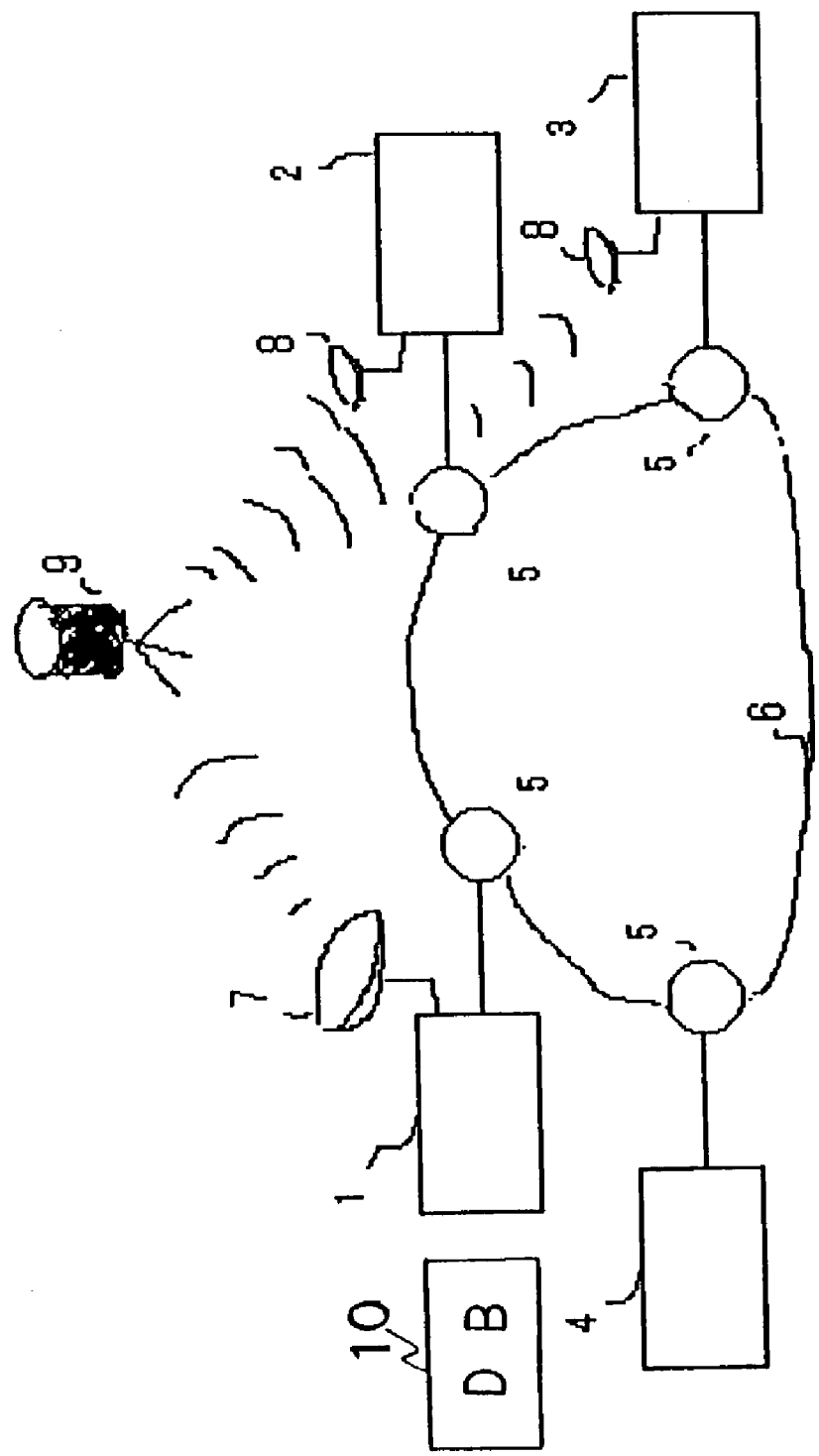
FIG. 2 is another configuration diagram of an MM information system according to the present invention.

FIG. 2 is another configuration diagram of an MM information system according to the present invention.

The system includes a sending terminal 1, a receiving terminals 2 and 3, a management terminal 4, a transfer device 5, a transfer system 6, a transmitter 7, a receiver 8 and a communication satellite 9. This embodiment is an asymmetrical network in which MM information transfer is divided into two systems including a shared transfer system specifically for transmission through the communication satellite 9 and a shared transfer system for mainly receiving control signals and so on through the transfer system 6. In other words, MM information from the sending terminal 1 is transferred from the transmitter 7 to the receiving terminal 2 and/or 3 including the receiver 8 through the communication satellite 9 by using the shared satellite communication line specifically for transmission. The receiving terminals 2 and 3 can receive the same MM information at the same time or can receive MM information from the sending terminal 1 separately. the receiving terminals 2 and 3, the sending terminal 1 and the management terminal 4 are connected through the transfer system 6 for the asynchronous communication like the first embodiment, which allows mutual communication (sending and receiving). The transfer system 6 in this case mainly transfers a control signal for controlling MM information. Thus, even the light load on the communication line is not problematic. Therefore, the transfer system 6 may be a shared communication network such as an ISDN line.

Next, an initial state of each of the terminals will be described. In the initial state, there are cases where MM information exists in the receiving terminal 2/3 or not. In other words, there are cases where:
(1) MM information in the sending terminal 1 is searched and is received from the receiving terminal 2/3; and
(2) Content information in MM information in the sending terminal 1 is searched and is received by the receiving terminal 2/3 by using the content information in the MM information as a key.

Then, the management terminal 4 is responsible for access authorization management for MM information. The sending terminal 1 sends data to the receiving terminal 2/3 in accordance with an instruction from the management terminal 4. The sending terminal 1 includes a database 10 for MM information basically.

There are two implementing methods (A-1) and (A-2) for the access authorization, including:
(A-1) implementing access authorization for information in accordance with an instruction from a system; and
(A-2) writing access authorization for information within data so that the data cannot be read as far as the data is rewritten (encoding package data).

The access authorization (A-1) is implemented under application software control not under data control. For example, the access authorization (A-1) includes data access authorization given to MM data viewing software and access authorization for MM information based on MM information use registration.

The access authorization (A-2) further includes access authorizations (A-2-1) and (A-2-2), for example.

The access authorization (A-2-1) inhibits intent information to be read and/or displayed (expanded) if the viewing action is not written as behavior information (reading block for operating viewing software); and The access authorization (A-2-2) inhibits information to view until the encrypted data is decrypted.

Therefore, the access authorization (A-1) is given by exchanging authorization control information. The access authorization (A-2) is given by rewriting and operating authorization information (existing in container information, behavior information and container information, respectively) within MM information or by following opening steps between the authorization information and the management terminal. For example, this is the case when control data is given to information data A, and when the data cannot read at "000+A" but can be read at "001+A", where "000" and "001" do not have any special meanings.

A user without access authorization may not open MM information. In this case, MM information can be used to implement partial reading and/or operational control such as allowing to read up to container information in general but inhibiting content information to be read without user registration and/or inhibiting MM information to operation if the behavior information cannot be read.

Figure 3:
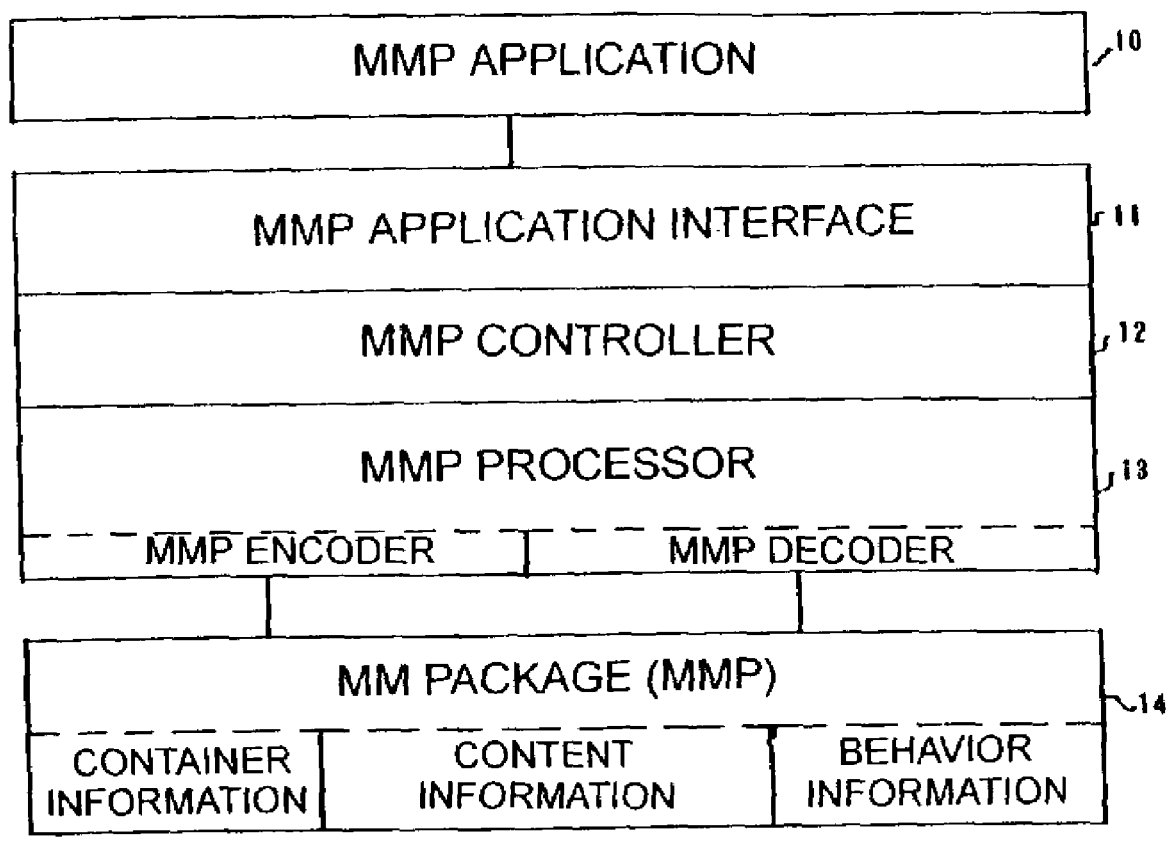
FIG. 3 is an explanatory diagram of a data processing hierarchy model.

Next, an explanatory diagram of a data processing hierarchy model is shown in FIG. 3. This is an example of a hierarchy model for implementing a data processing function for processing MM information according to the present invention in the sending terminal 1, the receiving terminals 2 and 3 and the management terminal 4. The hierarchy model includes, application software 10 for an MM information package (called MMP hereinafter), an MMP application interface 11, an MMP controller 12, an MMP processor 13 and an MM information package 14.

The application software 10 is created for each function of using MM information and controls processing for sending or receiving MMP data through the application interface 11. The application interface 11 performs processing for inputting user's determination and processing for outputting information to a user. In this case, the input/output device and an MM information display device for a user are provided but are omitted in the drawing. The MMP controller 12 transfers a signal between each terminal and a transfer device and controls MM information transferred to the MMP processor. The MMP processor 13 includes an MMP decoder for decoding transferred MM information and an MMP encoder for encoding MMP information when sending and/or using. The MMP package 14 is MMP information itself stored in the sending side or is MMP information itself transferred to the receiving side and includes container information, content information and behavior information.

As an example of MM information, in order to search a book in the library, the title, the author, the publisher, the abstract, the simple keyword of the book and so on are used for obtaining the target book. These kinds of brief content information are included in the container information. Therefore, the container information is searched. On the other hand, in order to search a book by using the content, the body information, a more specific keyword, the genre of the book and so on or in order to perform a image search or voice search, these kinds of information are included in content information. Thus, the content information is searched.

The "container information" includes outline information describing outlines of content information and behavior information. The outline information may include, for example:

a scalability profile: including a type or a level of scalability of content information;

a management profile: including copyright information, licensing requirement from the creator, personal use information and so on; and a media profile: including an outline of the content.

Here, the scalability means a measure for obtaining the variable quality of resolution and/or error tolerance and gives a hierarchy concept to an encoded structure. In addition, because of the scalability, a part of encoded data and/or encoded bit stream is extracted so as to reconstruct and/or decode meaningful image and information. For the scalability encoding, one of decoders having various complexities decodes an original moving image from a single encoded bit stream so as to reconstruct and display the image properly. Mainly, four kinds of method are provided for providing the basic variable characteristics, including space scalability, SNR scalability, time scalability and data partitioning.

For the space scalability, encoding is performed for providing multiple resolutions. In this case, images having different resolutions can be extracted from one bit stream. In addition, a transmission-error-proofed signal can be given to a lower layer so as to obtain a kind of error tolerance. The space scalability is characterized in using two special resolutions such as moving image application including communication, mutual conversion between moving image standards, overview of a moving image database, and mutual conversion between HDTV and SDTV. For the spatial scalability, in order to create a moving image layer for two spatial resolutions from one original moving image and to provide a basic spatial resolution, the lower layer encodes itself. Then, the upper layer uses the lower layer internally provided spatially to represent a complete spatial resolution of the original moving image signal. For example, the lower layer and the upper layer may be encoded in accordance with MPEG-2 Standard. The lower layer may be encoded in accordance with MPEG-1 Standard while the upper layer may be encoded in accordance with MPEG-2 Standard.

The SNR scalability can be applied when at least two layers are required for quality such as moving image application including communication, a moving image service in multiquality, SDTV and HDTV. The SNR scalability means to create two quality layers having the same resolution but different qualities from one moving image. The lower layer encodes itself so as to provide basic moving image quality. The upper layer encodes itself to improve the quality of the lower layer.

For the time scalability, the lower layer encodes itself so as to provide a basic time speed. The upper layer encodes by using a time estimate from the lower layer. These layers are multiplexed in time so as to provide a complete time resolution of the original moving image signal when decoding.

The data partitioning assumes a case where two channels can be used for transmitting and storing bit streams, such as an ATM network, terrestrial broadcasting and a magnetic medium. The bit stream is divided into channels. The important parts (such as a header, a motion vector and a low frequency DCT coefficient) are transferred through channels having fewer errors than the channel for transmitting unimportant data (such as high frequency DCT coefficient).

The basic kinds of scalability may be combined to obtain a hybrid scalability. The basic kinds of scalability can handle two layers for a moving image, including a lower layer and an upper layer. On the other hand, the hybrid scalability can handle three layers.

The "content information" is functionally divided into independent information, which is created by using a part of at least one piece of media information and has a meaning in use independently, and at least one piece of additional information to be added to the independent information to become closer to the original media information. The content information can be provided with multiple pieces of container information (which can include container information and/or behavior information typified thereby).

A hierarchy encoding method for spatial resolution, which may refer to special scalability proposed to the MPEG 2, can be used for dividing content information as an example preferable for moving image information. In an example of two-layer (maximum of four layers) in MPEG-2, an high resolution image as an original image is and a low resolution image, in which the original image is reduced to horizontally and vertically half by filtering, are created first. An image in each layer is divided into micro-blocks, which is encoded by an encoder. Here, motion estimation is performed for each layer, between layers and for each frame. Therefore, the image information is compressed. As content information, the encoded data is stored in a memory device within sending terminal once. The number of layers (two layers) is recorded in the scalability profile of the container information as the type name (MPEG-2) and the level of the special scalability.

In general, the low-resolution image (data) has the deteriorated special resolution. As a result, detail motion of the subject cannot be captured. However, brief motion can be stored by using a small amount of data capacity. On the other hand, while the high-resolution image (data) can only capture the motion of the subject locally but can be encoded in a detail area by increasing the special resolution of the detected amount of motion. When data having low and high resolutions are combined in motion estimation for each micro-block, a moving image in high quality, which is close to the original image, can be reconstructed.

The "behavior information" includes information of manipulating (such as reconstructing, searching, editing and processing) content information, which is set by a user. In addition, the behavior information can include history information of manipulations performed by the user in past information relating to a behavior in the receiving side, which is set by a sender. The behavior information does not have to be always included. When the moving image information in two layers is stored in the above-described example, the behavior information is not included therein.

(2) Service of Using a Multimedia Information

FIG. 4 shows an explanatory diagram of an example of applying a data structure (MMP) according to the present invention to a multimedia service. Here, an outline, available functions, mainly used MM information and a corresponding embodiment (remarks) for each service section are shown. The using forms are divided into searching, browser (Br), editing, summarizing and others. An O-shaped mark is given to a related available function. An O-shaped mark is given to mainly used information of MM information. Examples of each service are:

Electronic library: storing many pieces of multimedia information and being selected and used by a used;

Article service: automatically processing searched/transferred MM information in accordance with the number of days having passed since the transferred data;

Communication: exchanging MM information among multiple users;

Edit: creating and editing new MM information;

Presentation: reporting/presenting in a conference, for example, by using MM information; and Information supply: introducing one piece of MM information to another MM system.

Features of an example of a configuration of an MM information system according to the present invention and examples of several kinds of usage in which the MM information system according to the present invention can function properly will be described below in order shown in FIG. 4.

First Embodiment: Electronic Library

Figure 5:
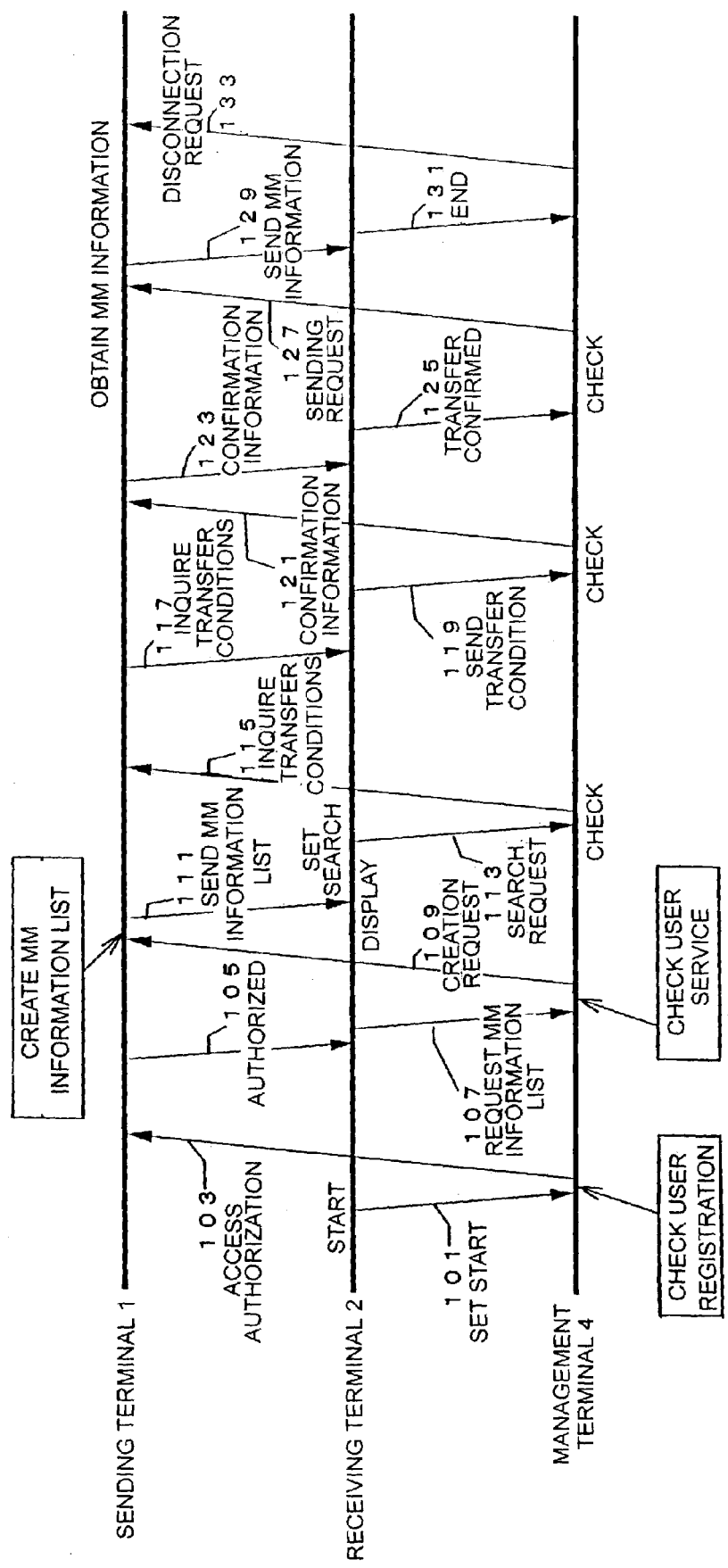
FIG. 5 is a sequence diagram for searching and obtaining MM information based on container information.

FIG. 5 shows a sequence diagram for searching and obtaining MM information by using container information. Here, specific steps of searching and transferring MM information by using the MM information system will be described below.

FIG. 5 is a sequence diagram showing steps of obtaining MM information in an electronic library, for example. FIG. 5 shows an outline of steps performed when a user A of the receiving terminal 2 searches and receives transfer of specified MM information (an moving image, here) in the sending terminal 1 in FIG. 1.

The receiving terminal 2 launches an application (MM information browser) and specifies or automatically inquires the start of use by a user of the management terminal 4 (101). The management terminal 4 checks user registration with respect to the user checks whether or not the user has already registered with the management terminal 4). The management terminal 4 sends access authorization of the user to the sending terminal 1 once the user registration is determined (103). The sending terminal 1 authorizes the receiving terminal 2 for the access (the preparation for receiving information from the sending terminal 1 is completed) (105). The receiving terminal 2 requests an MM information list of the user to the management terminal 4 (107). The management terminal 4 checks a user service (checks a service class available to the user). Once the user service is determined, the management terminal 4 requests the sending terminal 1 to create an MM information list for the user (109). The sending terminal 1 creates a service MM information list in accordance with the request from the management terminal 4. Here, the MM information list is created by gathering container information within the MM information and includes multiple pieces of container information. The sending terminal 1 sends MM information of MM information list to the receiving terminal 2 (111). The receiving terminal 2 receives and displays the MM information list.

The user of the receiving terminal 2 specifies to search container information. The receiving terminal 2 requests the management terminal 4 to search (113). The search request creates MM information using container information as a searched content or obtains identification information of the MM information from the container information and searches the MM information thereby. The search herein is for MM information. However, the available MM information varies depending on a user service. Next, the management terminal 4 checks user's requirements of use. When the user's requirements of use are met, the management terminal 4 inquires the transfer requirements of the specified MM information of the sending terminal 1 (115). Then, the sending terminal 1 inquires the transfer requirement of the specified MM information of the receiving terminal 2 (117). When the inquiry on the transfer requirements is received, the receiving terminal 2 sends the transfer requirements of the user to the management terminal 4 (the requirements are written in the behavior information within the MM information and are sent as MM information) (119). The management terminal 4 checks the user's requirements of use based on the user's transfer conditions.

When the user's requirements of use are met, the management terminal 4 sends confirmation information to the sending terminal 1 (121). Then, the sending terminal 1 sends the confirmation information to the receiving terminal 2 (123) Next, the receiving terminal 2 sends the transfer confirmation to the management terminal 4. The management terminal 4 further checks the user's requirements of use and once the transfer confirmation and so on is received, a location of MM information managed by the management terminal 4 is specified as required. If this is not specified, search processing is required. When the user's requirements of use are met, the management terminal 4 request the sending terminal 1 to send the specified MM information (requires to search the specified MM information (127). The sending terminal 1 obtains the specified MM information from the database in accordance with the request for sending (or searches the specified MM information) and sends the specified MM information to the receiving terminal 2 (129). Once the specified MM information is received, the receiving terminal 2 instructs the management terminal 4 to end (131). The management terminal 4 requests the sending terminal 1 to disconnect from the receiving terminal (133).

In the description above, the format of the data transmission information is all MM information. In the steps 101 to 109, each data transmission information can be implemented by entire MM information including behavior information, container information (hierarchical MM information) or content information, for example.

Figure 6:
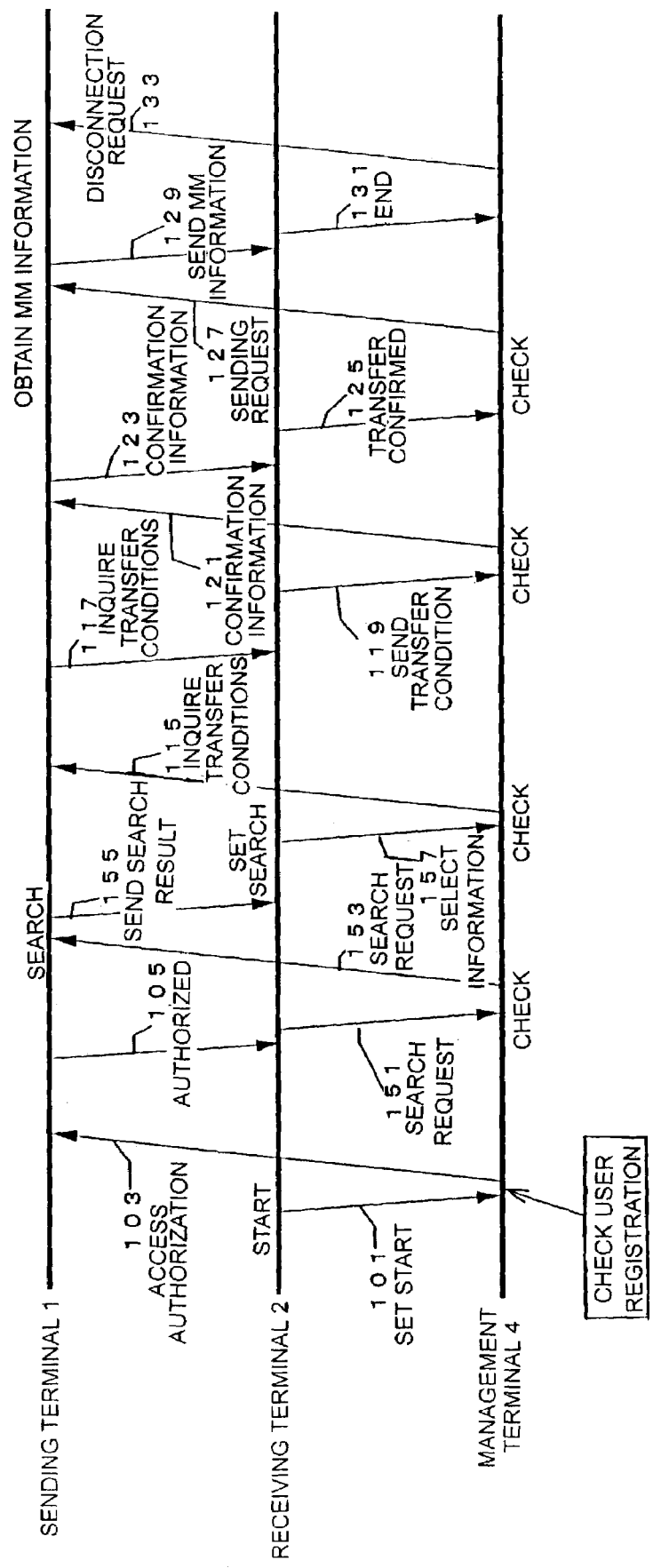
FIG. 6 is a sequence diagram for searching and obtaining MM information based on content information.

Next, FIG. 6 shows a sequence diagram for searching and obtaining MM information by using content information.

FIG. 6 shows a sequence for searching content information and relates to a search request based on MM information held by the receiving side. In this case, for example, the search request (content information) from the receiving terminal 2 is sent to the sending terminal 1 through the management terminal 4. Then, search processing is performed in the sending terminal 1 and the search result is returned to the receiving terminal 2 as MM information.

First of all, the receiving terminal 2 launches an application (MM information browser) and specifies or automatically inquires the start of use by a user of the management terminal 4 (101). The management terminal 4 checks user registration with respect to the user (checks whether or not the user has already registered with the management terminal 4). The management terminal 4 sends access authorization of the user to the sending terminal 1 once the user registration is determined (103). The sending terminal 1 authorizes the receiving terminal 2 for the access (the preparation for receiving information from the sending terminal 1 is completed) (105).

The receiving terminal 2 specifies a search based on the content information of the user. Th receiving terminal 2 requests the management terminal 4 to search (151). MM information is created by using content information as the searched content or identification information of the MM information is obtained from the content information to search the MM information. The search here is performed when MM information is always provided. However, the available MM information varies depending on a user service. The management terminal 4 checks the user's requirements of use. Once the user's requirements of use are met, the management terminal 4 requests the sending terminal 1 to search (153). The sending terminal 1 launches a search engine based on a search request. The sending terminal 1 creates the search request by the search engine as MM information and returns the search result to the receiving terminal 2 (155). The user of the receiving terminal 2 specifies a search based on the content information and instruct the management terminal 4 to select information (157) The steps after this are the same as the step 115 and thereafter in FIG. 5.

A specific example relating to the search based on the content information may be an image search as follows: The receiving terminal 2 has MM information including content information taken by a digital camera. The image information (feature amount (value information) of the image herein) is sent to the sending terminal 1 through the management terminal 4. The sending terminal 1 operates the search engine by using the value number key to search database. Here, as the search result, detail photography information may be obtained from one photograph. The painter and/or the historical background can be found from a picture in an art museum. Alternatively, a video scene may be taken from one still image. Today's baseball scene of all of batters may be taken from a photograph in which one baseball player is standing at a batter box. Thus, the search engine extracts detail information from partial information.

General advantages of this embodiment are:
the commonly usable information;
the copyright protection function;
the browsing function; and
the information search function.

In addition, the advantages inherent to this embodiment are as follows, for example:

Since a receiving capacity of each user is registered with the management terminal 4, one user may have a higher receiving capacity, for example. When the user needs to obtain MM information in high quality, all of the MM information can transferred. Then, MM information in high quality can be used. On the other hand, a user only having a lower receiving capacity or a user having a higher receiving capacity but requesting to obtain a content fast can receive the transfer of a part of MM information by requesting that. Thus, wasteful loads are not imposed on the transfer system and the storage capacity in the receiving side is not used wastefully. MM information can be transferred in a manner suitable for the convenience of the user.

This embodiment has been described by assuming that the sending terminal 1 has one MM information file. When another embodiment has many sending terminals, content information can be exchanged between mutual sending terminals. The user A can search not only MM information in the sending terminal 1 but also MM information in another sending terminal. The target range of the search can be increased. Thus, if required information is held in the other sending terminal than the sending terminal 1, the fact can be recognized. Thus, the receiving user can recognize the presence of the MM information in multiple sending terminals fast, which improves the usability. The transferring user (the provider of MM information( can improve the quality of the service by showing MM information other than the MM information held by the transferring user itself, which can improve the usability for increasing the number of users.

The application software 10 determines that the container information is the highest layer including content information and behavior information. The application software 10 always refers to the container information first and inhibits manipulations other than the manipulations meeting the requirements, such as those relating to the copyright. The function can be provided to the MMP controller 12 instead of the application software 10.

A bit stream encoded in time series, for example, may be used for the transfer of MM information. Here, the sending application software 10 transfers the content information first. Thus, the receiving application software 10 or MMP controller 12 can surely determine the requirements with reference to the content information received first.

Second Embodiment: Example of Article Service

Here, an example will be described in which required information is retrieved from newspaper article and is transferred by fax or by e-mail. The article service uses the MM information system according to the present invention to provide a service of transferring MM information in high quality.

In the MM information system in FIG. 1, a user A of the receiving terminal 2 and a user B of the receiving terminal 3 register the sending terminal 1 (or the other sending terminal) having each required MM information and created search conditions for the MM information with the management terminal 4 in advance. The application software of the management terminal 4 accesses and searches container information through the MM information created in the every morning, for example, in the registered sending terminal. If the MM information meeting with the search conditions is found, the MM information is transferred to each of the user entirely.

Figure 7:
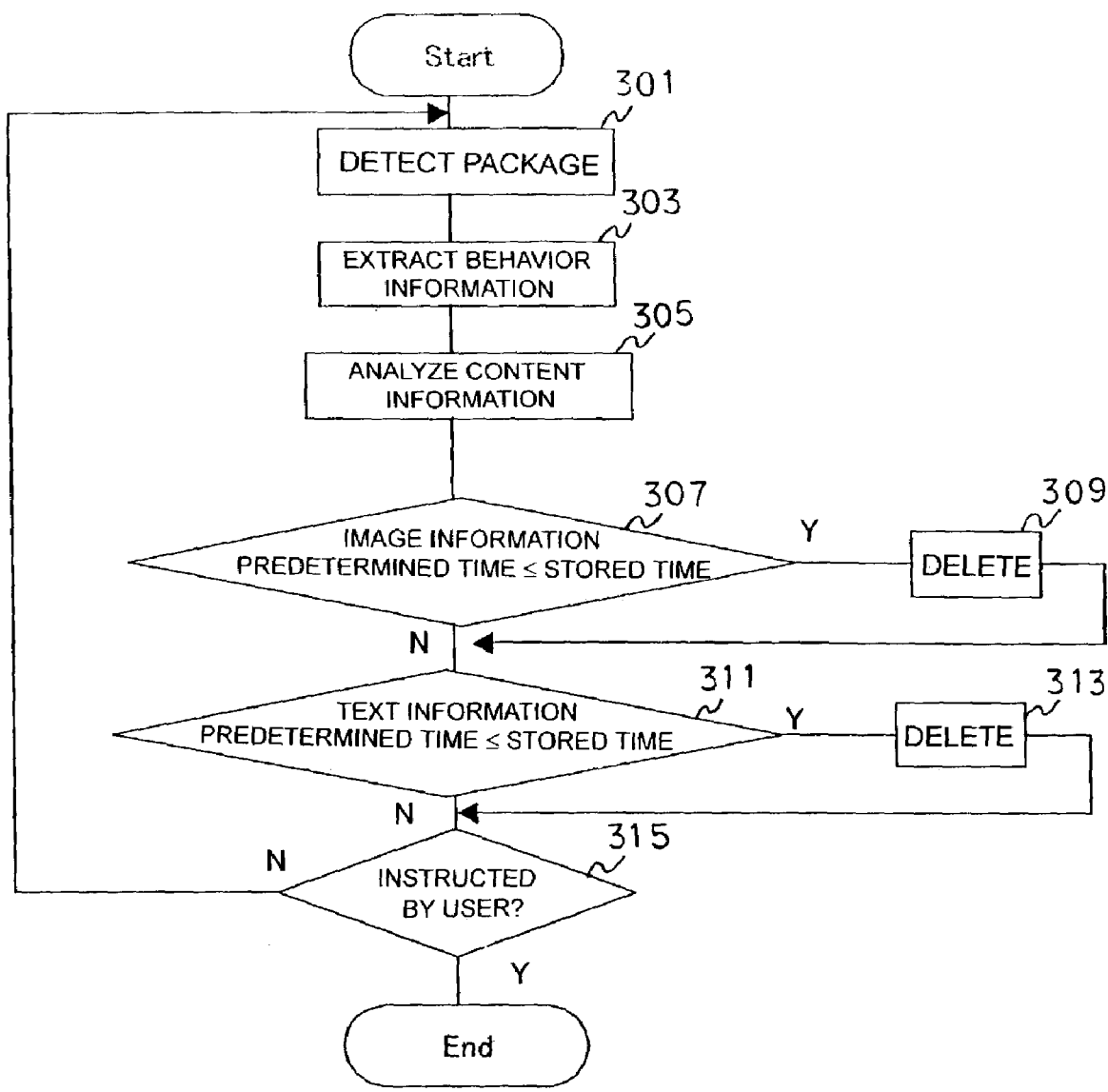
FIG. 7 is a flowchart showing processing steps for an article service.

FIG. 7 is a flowchart showing processing steps in the article service.

In accordance with the flowchart, the processing steps by the application software in the receiving terminal for each user will be described. The flowchart shows information processing steps (for example, information deletion) performed when information is automatically transferred, for example. When retrieved and transferred MM information exists in the receiving terminal, a processing portion is provided for monitoring a lapse of the MM information. The processing portion is automatically launched and deletes proper information after a predetermined storage period of time (one hour, one day, one month and the like).

FIG. 8 is an explanatory diagram showing a construction of an MM package in the article service, Here, as shown in FIG. 8(*a*), the MM information has container information (media profile) including heading information(text information), content information including text information for article sentences and compressed still image information, and behavior information recording a behavior condition after the receipt from the registered user, for example. A type of manipulation performed on the package information by a user is recorded in the behavior information of each package. The type of manipulation is written in a header of the media profile (type profile, description profile) content information, and the function information is written in the behavior information.

Settings may be specified for a case where the application software is not launched on the day of the transfer because the user is traveling, for example, and a case where transferred MM information exists in the receiving terminal. Here, when MM information based on a search result is transferred, or after a predetermined period of time, the application software is launched automatically and detects an MM package, which has not been manipulated by a user yet (S301). Next, behavior information in the MM packet is extracted (S303) and analyzes stored days, time and so on of each content information based on an instruction written in the behavior information (S304). Based on the analyzed stored days and time, image information transferred previously and passed three or more days, for example, is deleted (S307 and S309) (See FIG. 8(b)). Furthermore, an article sentence information is deleted after the stored days, time and so on, for example, after 10 days (S311 and S313). Finally, only the heading information and text based on the container information are left (see FIG. 8(c)). This processing may be repeated or ended in accordance with an instruction by the user (S315).

Generally, the image information needs larger capacity than text information even when both of them are compressed. Through the data processing by the application software as above, when a large amount of search result is transferred but the receiving terminal of the user has limited capacity for storing the MM information, the container information, which is not used immediately, is deleted. Therefore, a case can be avoided where MM information cannot be received because the memory capacity of the user's terminal reaches to the use limit. The storage capacity of the receiver can be used effectively. Furthermore, processing for deleting other information such as voice information can be added in accordance with predetermined storage days, time and so on.

Figure 9:
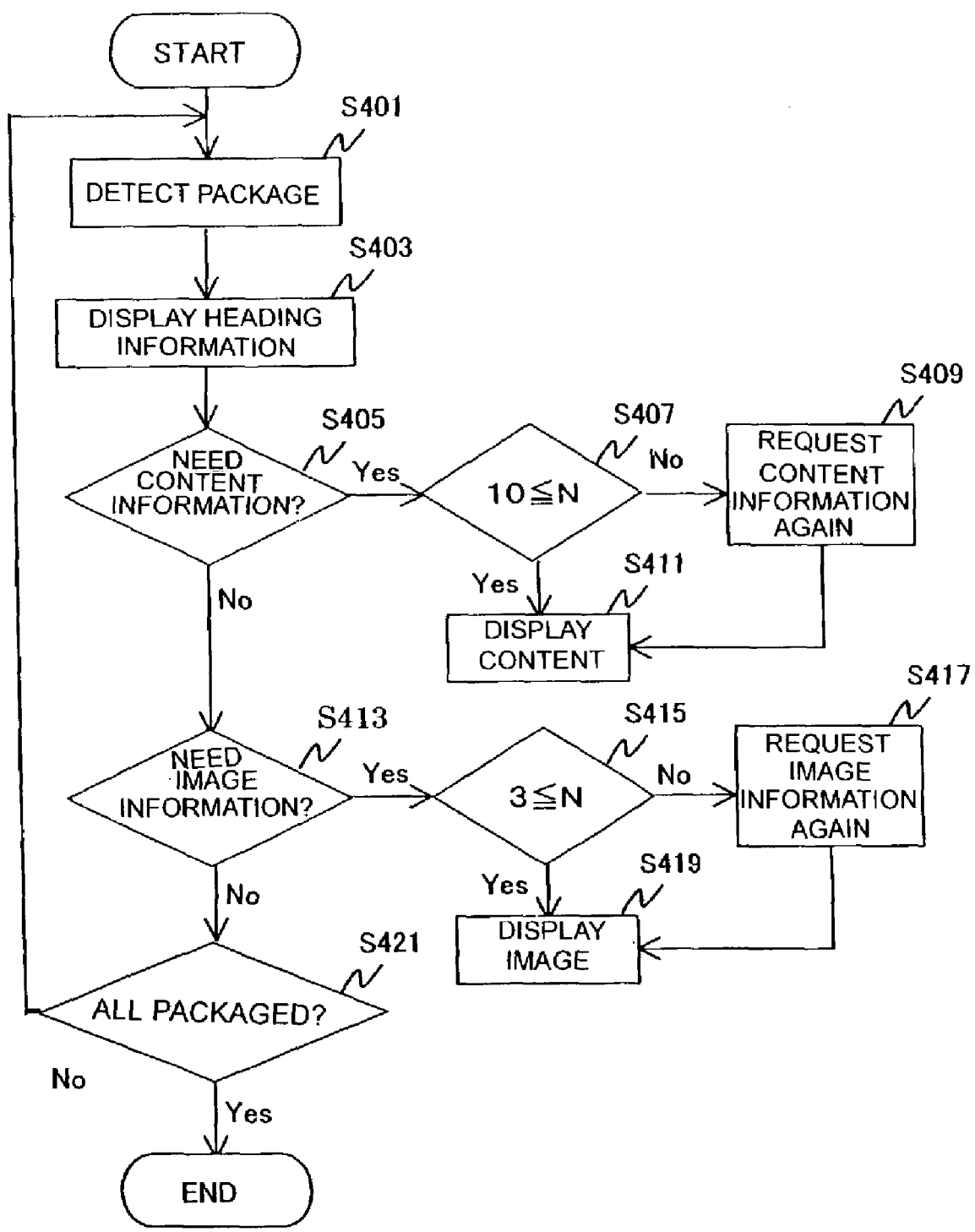
FIG. 9 is a flowchart showing processing performed when more information is required during information viewing.

Next, FIG. 9 shows a flowchart for processing performed when a user needs more information while viewing information.

For example, a user returned from a travel can check unchecked heading information based on manipulation information stored in the behavior information in each MM package. Furthermore, in order to view the article sentences or the image content, the user can request it to the transfer center again. The steps in the flowchart will be described below.

When a user starts the application software (for example, every day), the application software detects the transferred MM package (S401). Then, the application software displays to the user heading information included in the container information (S403). The user refers to the heading information, and when it is important information, the user can further determine whether the user views the content (article sentences) and the image (still image) or not. Here, N indicates a difference between a date when the MM package is transferred and a date when the application software is started by the user. When the user determines that the content information is needed (S405), the content information of the MM information is displayed (S411) if the information is not deleted by the above-described deletion processing before passing 10 days or more, for example (S409). On the other hand, after 10 days or more, the content information of the MM information is deleted. Thus, the user needs to request the content information again (S409), and the content information is then displayed (S411).

Similarly, content information of the MM information for the image information is displayed (S415) if it is determined as necessary (S413) and if three or more days are not passed, for example (S409). On the other hand, if three or more days are passed, the content information of the MM information is deleted. Therefore, the content information is requested again (S417) and then the content is displayed (S419). In this way, the processing is performed repeatedly on all packages (S421).

The general advantages of this embodiment are:
 the browsing function: allowing fast determination regarding whether the information is needed or not since the heading can be obtained from the container;
 recording manipulation information; and
 receiving in package: eliminating a need for real time transmission and allowing to compensate transmission delays.

The advantage unique to this embodiment is to use the storage capacity of the receiving terminal effectively even when the storage capacity is limited.

The above-described embodiment describes the example where image and text information is deleted in order after a predetermined days from the delivery date. Furthermore, as a preferable example in a certain type of receiving terminal, a maximum amount of storable capacity for a predetermined article service may be set and the days until the deletion may be changed in accordance with the occupied condition. Here, a terminal having a smaller amount of storable capacity can retrieve at least heading information in container information fast, which improves the convenience for users.

(Usage for Transferring Information to Mobile Terminal in Accordance with Priority: Secretary Function)

A priority can be given to one retrieved from article information as described in the second embodiment. MM information of the present invention has behavior information. When management terminal defines the searched information as especially important, the sending terminal 1 writes the priority of the information in the behavior information as an behavior by the receiver. The behavior information retrieves document information from content information by using the scalability structure.

When MM information having important data behavior information is delivered, the application software of the receiving terminal displays the heading information as soon as the information arrives. When a user A of the receiving terminal 1 does not exist near the terminal, the place to transfer may be preset. When the user has a mobile terminal separately from the receiving terminal, and when the user can transfer the content information including the heading and the document from the receiving terminal to the mobile terminal, the information is sent to the mobile terminal. An advantage unique to this embodiment is that important information can be used in time.

Third Embodiment: An Example of Communication Between Users

Next, another embodiment of the present invention will be described where users can communicate by using MM information mutually with scalability.

Figure 10:
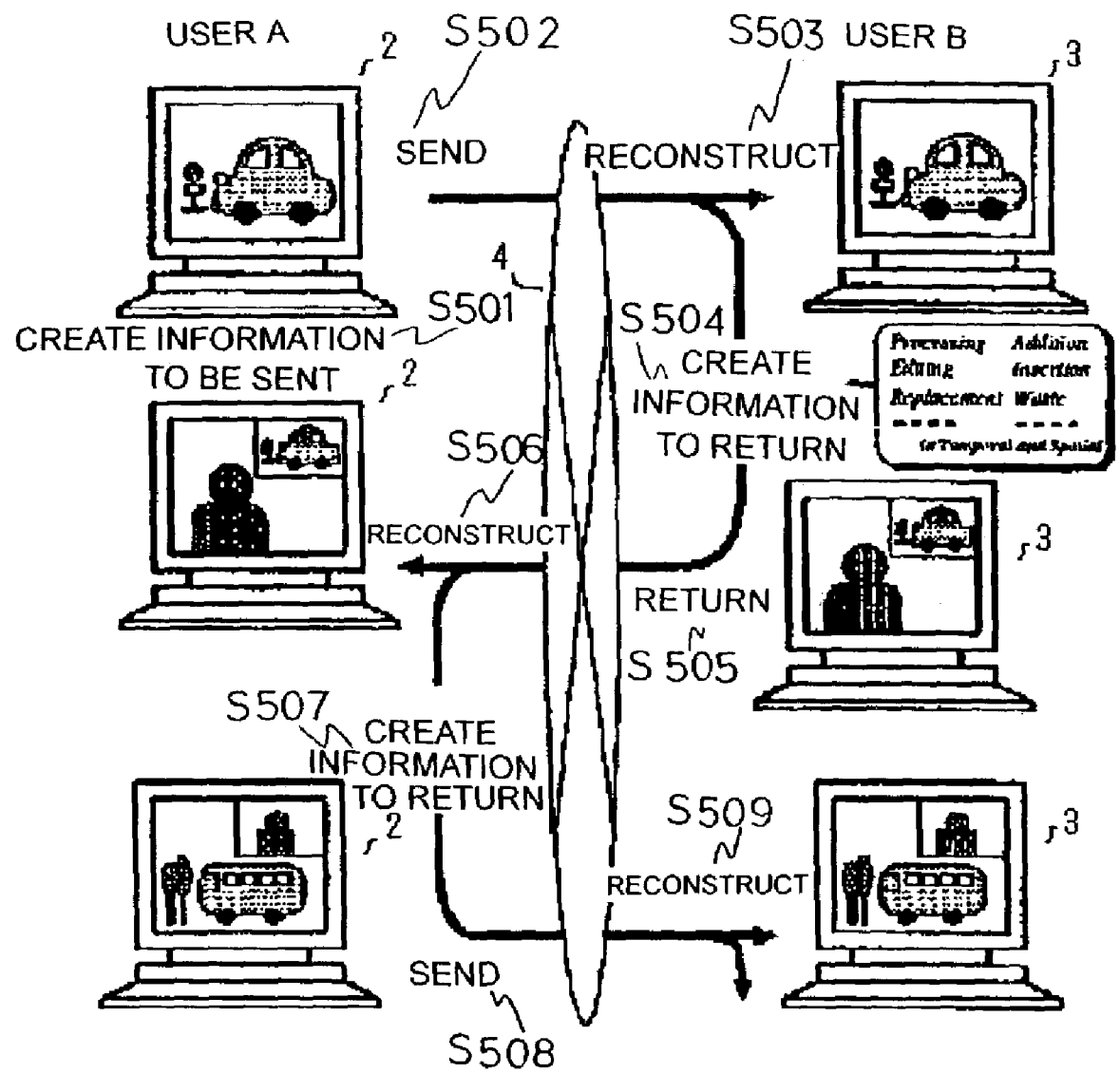
FIG. 10 is an explanatory diagram showing mutual communication between users according to the present invention.

FIG. 10 is an explanatory diagram showing a mutual communication between users according to the present invention.

This embodiment includes a receiving terminal 2 used by a user A, a receiving terminal 3 used by a user B, and a transfer system (network) 4. Here, the receiving terminals 2 and 3 are the information sender and receiver.

First of all, at a step S501, the user A creates image information to send. Then, based on the spatial scalability, the image is encoded as content information having low-resolution information TB and high-resolution information TE. At a step S502, the user A transfers MM information from the receiving terminal 2 to the receiving terminal 3 through the transfer system 4. At a step S503, the user B reconstructs the transferred MM information by using both of the low resolution and high-resolution information TB and TE. At a step S504, the user B creates new image information to return. In this example, a frame is divided into four. The transferred low resolution information TB and the created low resolution screen are independently used as information for ¼ screen (one frame) and divided three frames, respectively. The behavior information of the created MM information includes name information of the low-resolution information TB and the high-resolution information TE, on which the editing is based. At a step S505, the user B returns created image information to the user A. At a step S506, the user A selects any one of the divided three frames with low resolution in the returned image information for reconstruction and/or reuse (all of them have similar contents). The user A has the original image information sent by the user A. Thus, the image can be displayed by using the high-resolution information TE with higher resolution than the returned low-resolution information TB. Furthermore, the user A creates information to which new low resolution image divided into four (¼ image) added (S507) and returns the information to the user B (S508). The user B reconstructs the image (S509).

In this way, the image information sent from one user to the other can be reused so as to exchange MM information. While the users A and B are communicating to each other, the sending terminal 1 and the management terminal 4 in FIG. 1 do not operate. However, when one of the users A and B desires to disclose the MM information created in both of them and sets the disclosure conditions (regarding copyright and so on), the intention is notified to the management terminal 4, with which the disclosure conditions are registered. After predetermined processing, the MM information is sent to the sending terminal 1 and can be stored to be available to the others.

Advantages of this embodiment are:
reuse of information; and
processable information structure.

Fourth Embodiment: Embodiment of the Present Invention in Remote Education) (Including Presentation Next, a fourth embodiment will be described in which the present invention is applied to remote education.

Figure 11:
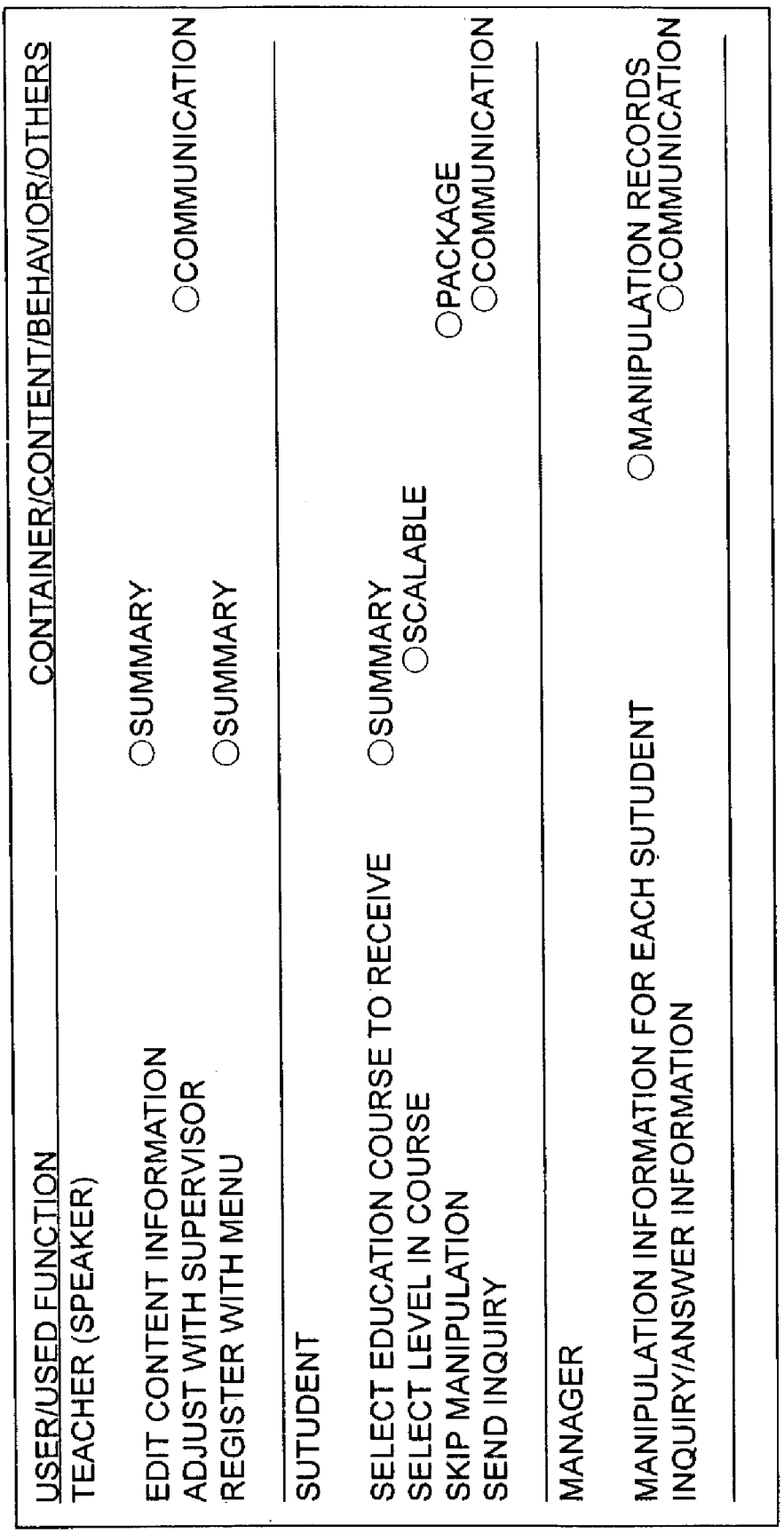
FIG. 11 is an explanatory diagram showing users and used functions in remote education.
Figure 12:
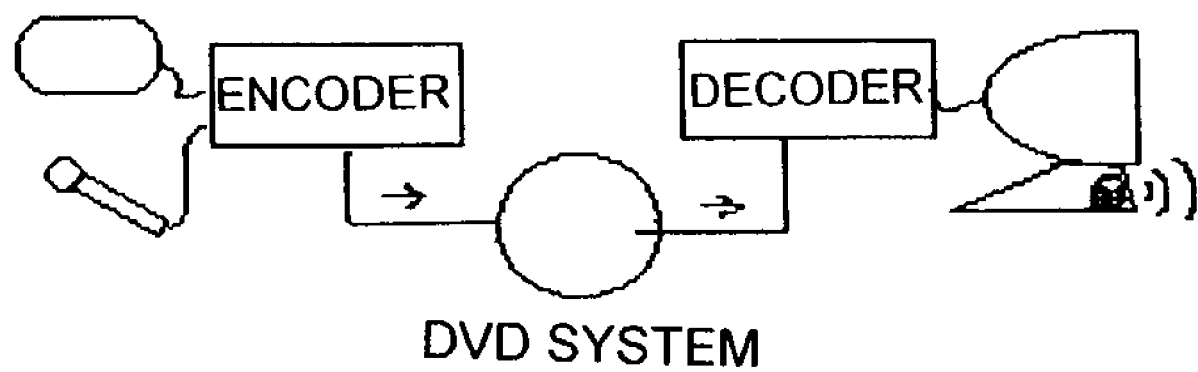
FIG. 12 is a diagram for explaining a digital video disk system.

FIG. 11 is an explanatory diagram showing users and used functions. According to FIG. 11, container, content, behavior and other information relating to users/used functions is stored.

In order to create a teaching material including MM information for remote education. A teacher who is a user of MM information in the first row in FIG. 11 uses the electronic library function described in the first embodiment to retrieve many pieces of MM information stored in the sending terminal 1 in FIG. 1. Then, required pieces of MM information (such as image, voice, text and graphics) can be gathered. The teacher can use the editing function according to the third embodiment to edit the MM information and to create one packaged remote education material. The created remote education material includes outline information in the container information and is registered with the sending terminal 1 as one of the teaching material menu. The management terminal manages terms and conditions of the teaching material.

A student who is another user of the MM information in the second row of FIG. 11 uses the receiving terminals 2 and 3 in FIG. 1 to inquire the teaching material of the sending terminal 1. The student can search many remote education teaching materials registered with the sending terminal 1 and can send a teaching material needed to him/her from the menu. When a teaching material to use is determined, the student applies to the management terminal 4 in FIG. 1 for receiving the delivery of the teaching material selected by him/her at one of the receiving terminals 2 and 3. The student can use the scalability of content information to select his/her preferred display format of the MM information. For example, a student interested in an image can study with a high quality image by using all image information. A student who can understand a content only from a document can check the main point quickly by using a low quality image only.

When the construction of MM information of the remote teaching material is arranged in chapter and section, a student can skip chapters and/or sections in accordance with his/her knowledge by using the application software function of the receiving terminals 2 and 3. As a result, the usability can be improved. Each of the receiving terminals used by a student and/or a teacher preferably has a sending function to be used when the teacher can answer to a question from the student.

A manager who is a user of the MM information in the last row in FIG. 11 can fined a state of using the remote education teaching material for each student based on the behavior information. The manager can find a state of using each of teaching materials in the menu, contents viewed by students with interests and skipped contents. This is effective for improving the remote education teaching material in the future and for grasping the degree of use. Furthermore, grasping a condition relating to questions and answers exchanged between students and teachers can effectively improve the quality of remote education teaching materials.

General advantage of this embodiment are as follows:
A teacher can have functions for reusing, editing, reprocessing, copyright protection and browsing;
a student can have arrangements for searches, bookmarks, manipulation information, and components in package; and
a manager can have a function for recording manipulation information.

An advantage unique to this embodiment is that a student can easily select a remote education teaching material because MM information is packaged. In addition, content information is packaged in chapter or in section. Thus, a skip manipulation fitting to the degree of understanding and knowledge of a student can be performed in the receiving terminal, which can further improve the usability.

Fifth Embodiment: Application to Presentation

Most parts of the application function to the remote education in FIG. 11 can be applied to presentation performed in a lecture, for example.

A speaker who corresponds to the teacher in the remote education case in FIG. 11 edits a presentation content as MM information in advance and transfers it to a terminal (receiving terminal 2) in a presentation place. The speaker can combine moving image, still image, voice, text, and graphic information freely for effective presentation. When the presentation time is changed, the presentation content can be extended or reduced by combining a level selection within a course and a skip manipulation.

When MM information, which is not planed in advance, is needed in questions and answers in presentation, the speaker can request the sending terminal 1 to retrieve and transfer the needed information. Alternatively, the speaker can use the information for explaining his/her answer while receiving.

A method of using multimedia information according to the present invention can be implemented by a computer readable recording medium storing a multimedia information using program, a program product, which can include a multimedia information using program and can be loaded to an internal memory of a computer, and a program product, which includes a multimedia information using program and is stored in a computer usable recording medium.

INDUSTRIAL APPLICABILITY (1) Common-Usability, Compliance and Reusability of Information Information can be used among media commonly. Compliance with existing media: received package information can be used for transmission again. Thus, a user can process information and return processed information easily.

(2) Editing Function and Processable Information Construction

A user can construct new media information by editing, combining and processing each media information freely. Thus, the MM information can be edited and be reused easily.

(3) Copyright Protection Function

Authorization information relating to copyright of an expression and/or usage of information can be handled. Security protection can be provided as personal information. Therefore, managers and users can manage information easily.

(4) Browsing Function

A user can check an expression content easily. Therefore, the user can determine the meaningfulness of information. A billing system for meaningful information can be established.

(5) Information Search Function

An information search function corresponding to a table of contents or an index can be provided. Therefore, even when large and/or complex information received by a user easily can be searched.

Since content information and container information are written, a type of search can be performed by going to library A to retrieve content information B having mark C.

(6) Bookmark Function

A person who obtains information can paste or remove a bookmark. Thus, the user can organize even large and/or complex information easily.

(7) Related Description Between Different Pieces of Media Information

For example, a desk is selected from an electronic catalog, information including the perspective diagram, size table, serial number and price of the desk can be listed and viewed easily.

(8) Recording Manipulation Information

Information can be reconstructed automatically. Thus, a user can handle information easily.

(9) Securing Independent Reconstruction of Information in Package

A user does not always have to receive information in real time.

A user can identify necessary information, and data can be stored easily.

A large amount of data can be transmitted and be stored in advance. Thus, information supposed to use can be transmitted and be stored in a used terminal. Then, a transmission delay in use (such as reconstruction) can be absorbed.

By using a common package format, information can be used uniformly among various services.

(10) Reduction of Decoding Processing and Display Processing by Terminal

Higher quality and display speed are provided, as typically found in smaller and finer display device.

A standardized content format is used.

Scalability is used for image compression.

The invention claimed is:

1. A method of using multimedia information for using a multimedia information system, having a sending terminal storing a plurality of multimedia (MM) information, a receiving terminal for sending or receiving MM information by a user and a management terminal for managing transfer of information, and in which a plurality of multimedia information is at least one of transferred, stored, and used between the sending terminal and the receiving terminal, the method comprising the steps of:

requesting an MM information list of a user to the management terminal by the receiving terminal;

requesting the sending terminal to create an MM information list by the management terminal when a service class available to the user is identified;

gathering container information within the MM information, creating MM information list and sending the MM information list to the receiving terminal by the sending terminal in accordance with the request from the management terminal;

receiving and displaying the MM information list, setting searching or editing or processing based on the container information and requesting searching or editing or processing to the management terminal by the receiving terminal;

requesting searching or editing or processing and sending specified MM information to the sending terminal by the management terminal when user's condition of use and a transfer condition of the specified MM information are checked and the conditions are satisfied;

searching or editing or processing and obtaining the specified MM information from a database and sending the specified MM information to the receiving terminal by the sending terminal in accordance with the request; and receiving the specified MM information by the receiving terminal further comprising the steps of:

when the receiving terminal is not launched for a predetermined period of time from a date or time when MM information is transferred, automatically launching the receiving terminal and detecting MM information which has not been manipulated by a user yet;

extracting behavior information of the detected MM information;

deleting first content information, which is transferred first and left for a first predetermined period of time or more, from the content information of the MM information based on stored days or time of each content information included in the extracted behavior information; and deleting second content information left for a second predetermined period of time longer than the first predetermined period of time from the content information of the MM information.

2. A method of using multimedia information according to claim 1, wherein the request for searching or editing or processing sends MM information in which the container information is a searched or edited or processed content or MM information of identification information obtained from the container information.

3. A method of using multimedia information according to claim 1, wherein the MM information includes container information including outline information for identifying MM information, content information constructed by media information itself, and behavior information for manipulating the content information.

4. A method of using multimedia information according to claim 1, wherein the behavior information includes information on manipulation by a user including reconstructing, searching, editing or processing content information, history information of manipulation performed by the user in past or information relating to a behavior in a receiver, which is set by a sender.

5. A method of using multimedia information according to claim 1, wherein a data transmission form is MM information one of behavior information within MM information, container information or entire MM information including content information.

6. A method of using multimedia information according to claim 1, in order to check the user's condition of use and the transfer condition of the specified MM information by the management terminal, the method further comprising the steps of:
checking the user's condition of use and, when the user's condition of use is satisfied, inquiring the transfer condition of the specified MM information to the sending terminal by the management terminal;
inquiring the transfer condition of the specified MM information to the receiving terminal by the sending terminal;
sending the user's transfer condition to the management terminal by the receiving terminal when the inquiry relating to the transfer condition is received;
checking the user's condition of use based on the user's transfer condition and, when the user's condition of use is satisfied, sending confirmation information to the sending terminal by the management terminal;
sending confirmation information to the receiving terminal by the sending terminal;
sending transfer confirmation to the management terminal by the receiving terminal; and
checking the user's condition of use and performing at least one of requesting sending, requesting searching, and/or searching or editing or processing the specified MM information to the sending terminal by the management terminal when the transfer confirmation is obtained.

7. A method of using multimedia information according to claim 1, further comprising the steps of:
instructing the management terminal to end by the receiving terminal after receiving the specified MM information; and
requesting the sending terminal to disconnect from the receiving terminal by the management terminal.

8. A method of using multimedia information according to claim 1, further comprising the steps of:

detecting MM information stored in the receiving terminal by the receiving terminal;
displaying, searching or editing or processing container information of the MM information and selecting desired MM information;
where a first content information of content information of the selected MM information is required, displaying the first content information when the first content information is transferred and is not left for a first predetermined period or time or more based on stored days or time of each content information included in behavior information, or, requesting the first content information to the sending terminal again when the first content information is transferred and is left for the first predetermined period or of time or more; and
where a second content information of content information of the selected MM information is required, displaying the second content information when the second content information is transferred and is not left for a second predetermined period or time or more based on stored days or time of each content information included in behavior information, or, requesting the second content information to the sending terminal again when the second content information is transferred and is left for the second predetermined period of time or more.

9. A method of using multimedia information according to claim 1, further comprising the steps of:
specifying the start of use by a user or automatically inquiring to the management terminal by the receiving terminal;
sending access authorization for the user to the sending terminal by the management terminal when user registration about the user is identified; and
authorizing an access to the receiving terminal by the sending terminal in accordance with the access authorization from the management terminal.

10. A method of using multimedia information for using a multimedia information system, which includes a sending terminal storing a plurality of multimedia (MM) information, a receiving terminal for sending or receiving MM information by a user and a management terminal for managing transfer of information, and in which a plurality of multimedia information is at least one of transferred, stored, and used between the sending terminal and the receiving terminal, the method comprising the steps of:
requesting searching or editing or processing to the management terminal by the receiving terminal based on content information of MM information held by the receiving terminal itself;
requesting searching or editing or processing to the sending terminal by the management terminal when user's condition of use is satisfied;
creating a searched or edited or processed result as MM information by the sending terminal based on the request for searching or editing or processing, and returning the searched or edited or processed result to the receiving terminal;
setting searching or editing or processing based on content information and instructing the management terminal to select information by the receiving terminal;
requesting searching or editing or processing and sending specified MM information to the sending terminal by the management terminal when user's condition of use and a transfer condition of the specified MM information are checked and the conditions are satisfied;

searching or editing or processing and obtaining the specified MM information from a database and sending the specified MM information to the receiving terminal by the sending terminal in accordance with the request; and receiving the specified MM information by the receiving terminal further comprising the steps of:

when the receiving terminal is not launched for a predetermined period of time from a date or time when MM information is transferred, automatically launching the receiving terminal and detecting MM information which has not been manipulated by a user yet;

extracting behavior information of the detected MM information;

deleting first content information, which is transferred first and left for a first predetermined period of time or more, from the content information of the MM information based on stored days or time of each content information included in the extracted behavior information; and deleting second content information left for a second predetermined period of time longer than the first predetermined period of time from the content information of the MM information.

11. A method of using multimedia information according to claim 10, wherein the request for searching or editing or processing sends MM information in which the content information is a searched or edited or processed content or MM information of identification information obtained from the content information.

12. A method of using multimedia information according to claim 10, wherein the MM information includes container information including outline information for identifying MM information, content information constructed by media information itself, and behavior information for manipulating the content information.

13. A method of using multimedia information according to claim 10, wherein the behavior information includes information on manipulation by a user including reconstructing, searching, editing or processing content information, history information of manipulation performed by the user in past or information relating to a behavior in a receiver, which is set by a sender.

14. A method of using multimedia information according to claim 10, wherein a data transmission form is MM information one of behavior information within MM information, container information or entire MM information including content information.

15. A method of using multimedia information according to claim 10, in order to check the user's condition of use and the transfer condition of the specified MM information by the management terminal, the method further comprising the steps of:

checking the user's condition of use and, when the user's condition of use is satisfied, inquiring the transfer condition of the specified MM information to the sending terminal by the management terminal;

inquiring the transfer condition of the specified MM information to the receiving terminal by the sending terminal;

sending the user's transfer condition to the management terminal by the receiving terminal when the inquiry relating to the transfer condition is received;

checking the user's condition of use based on the user's transfer condition and, when the user's condition of use is satisfied, sending confirmation information to the sending terminal by the management terminal;

sending confirmation information to the receiving terminal by the sending terminal;

sending transfer confirmation to the management terminal by the receiving terminal; and checking the user's condition of use and performing at least one of requesting sending, requesting searching, and/or searching or editing processing the specified MM information to the sending terminal by the management terminal when the transfer confirmation is obtained.

16. A method of using multimedia information according to claim 10, further comprising the steps of:

instructing the management terminal to end by the receiving terminal after receiving the specified MM information; and requesting the sending terminal to disconnect from the receiving terminal by the management terminal.

17. A method of using multimedia information according to claim 10, further comprising the steps of:

detecting MM information stored in the receiving terminal by the receiving terminal;

displaying, searching or editing or processing container information of the MM information and selecting desired MM information;

where a first content information of content information of the selected MM information is required, displaying the first content information when the first content information is transferred and is not left for a first predetermined period or time or more based on stored days or time of each content information included in behavior information, or, requesting the first content information to the sending terminal again when the first content information is transferred and is left for the first predetermined period or of time or more; and where a second content information of content information of the selected MM information is required, displaying the second content information when the second content information is transferred and is not left for a second predetermined period or time or more based on stored days or time of each content information included in behavior information, or, requesting the second content information to the sending terminal again when the second content information is transferred and is left for the second predetermined period of time or more.

18. A method of using multimedia information according to claim 10, further comprising the steps of:

specifying the start of use by a user or automatically inquiring to the management terminal by the receiving terminal;

sending access authorization for the user to the sending terminal by the management terminal when user registration about the user is identified; and authorizing an access to the receiving terminal by the sending terminal in accordance with the access authorization from the management terminal.

19. A recording medium storing a program of using multimedia information for using a multimedia information system which includes a sending terminal storing a plurality of multimedia (MM) information, a receiving terminal, for sending or receiving MM information by a user and a management terminal for managing transfer of information, and in which a plurality of multimedia information is at least one of transferred, stored, and used between the sending terminal and the receiving terminal, the method comprising the steps of:

requesting an MM information list of a user to the management terminal by the receiving terminal;

requesting the sending terminal to create an MM information list by the management terminal when a service class available to the user is identified;

gathering container information within the MM information, creating MM information list and sending the MM information list to the receiving terminal by the sending terminal in accordance with the request from the management terminal;

receiving and displaying the MM information list, setting searching or editing or processing based on the container information and requesting searching or editing or processing to the management terminal by the receiving terminal;

requesting searching or editing or processing and sending specified MM information to the sending terminal by the management terminal when user's condition of use and a transfer condition of the specified MM information are checked and the conditions are satisfied;

searching or editing or processing and obtaining the specified MM information from a database and sending the specified MM information to the receiving terminal by the sending terminal in accordance with the request; and receiving the specified MM information by the receiving terminal further comprising the steps of:

when the receiving terminal is not launched for a predetermined period of time from a date or time when MM information is transferred, automatically launching the receiving terminal and detecting MM information which has not been manipulated by a user yet;

extracting behavior information of the detected MM information;

deleting first content information, which is transferred first and left for a first predetermined period of time or more, from the content information of the MM information based on stored days or time of each content information included in the extracted behavior information; and deleting second content information left for a second predetermined period of time longer than the first predetermined period of time from the content information of the MM information.

20. A recording medium storing a program of using multimedia information for using a multimedia information system which includes a sending terminal storing a plurality of multimedia (MM) information, a receiving terminal, for sending or receiving MM information by a user and a management terminal for managing transfer of information, and in which a plurality of multimedia information is at least one of transferred, stored, and used between the sending terminal and the receiving terminal, the method comprising the steps of:

requesting searching or editing or processing to the management terminal by the receiving terminal based on content information of MM information held by the receiving terminal itself;

requesting searching or editing or processing to the sending terminal by the management terminal when user's condition of use is satisfied;

creating a searched or edited or processed result as MM information by the sending terminal based on the request for searching or editing or processing and returning the searched or edited or processed result to the receiving terminal;

setting searching or editing or processing based on content information and instructing the management terminal to select information by the receiving terminal;

requesting searching or editing or processing and sending specified MM information to the sending terminal by the management terminal when user's condition of use and a transfer condition of the specified MM information are checked and the conditions are satisfied;

searching or editing or processing and obtaining the specified MM information from a database and sending the specified MM information to the receiving terminal by the sending terminal in accordance with the request; and receiving the specified MM information by the receiving terminal further comprising the steps of:

when the receiving terminal is not launched for a predetermined period of time from a date or time when MM information is transferred, automatically launching the receiving terminal and detecting MM information which has not been manipulated by a user yet;

extracting behavior information of the detected MM information;

deleting first content information, which is transferred first and left for a first predetermined period of time or more, from the content information of the MM information based on stored days or time of each content information included in the extracted behavior information; and deleting second content information left for a second predetermined period of time longer than the first predetermined period of time from the content information of the MM information.

21. A multimedia information system, comprising:

a sending terminal having a database storing a plurality of multimedia (MM) information;

a receiving terminal for sending or receiving MM information by a user;

a management terminal for managing transfer of information; and a transfer system to which the sending terminal and the receiving terminal are connected, in which a plurality of multimedia information is at least one of transferred, stored, and used through the transfer system, wherein the receiving terminal requests an MM information list of a user to the management terminal;

the management terminal requests the sending terminal to create an MM information list when a service class available to the user is identified;

the sending terminal gathers container information within the MM information, creates MM information list and sends the MM information list to the receiving terminal in accordance with the request from the management terminal;

the receiving terminal receives and displays the MM information list, sets searching or editing or processing based on the container information and requests searching or editing or processing to the management terminal;

the management terminal requests searching or editing or processing and sending specified MM information to the sending terminal when user's condition of use and a transfer condition of the specified MM information are checked and the conditions are satisfied;

the sending terminal searches or edits or processes and obtains the specified MM information from a database and sends the specified MM information to the receiving terminal in accordance with the request; and the receiving terminal receives the specified MM information;

when the receiving terminal is not launched for a predetermined period of time from a date or time when MM information is transferred, automatically launching the receiving terminal and detecting MM information which has not been manipulated by a user yet;

structure for extracting behavior information of the detected MM information;

structure for deleting first content information, which is transferred first and left for a first predetermined period of time or more, from the content information of the MM information based on stored days or time of each content information included in the extracted behavior information; and structure for deleting second content information left for a second predetermined period of time longer than the first predetermined period of time from the content information of the MM information.

22. A multimedia information system according to claim 21, wherein the transfer system includes:
a first shared transfer system for transferring MM information; and
a second shared transfer system for mainly transferring and receiving a control signal.

23. A multimedia information system, comprising:
a sending terminal having a database storing a plurality of multimedia (MM) information;
a receiving terminal for sending or receiving MM information by a user;
a management terminal for managing transfer of information; and
a transfer system to which the sending terminal and the receiving terminal are connected, in which a plurality of multimedia information is at least one of transferred, stored, and used through the transfer system, wherein the receiving terminal requests searching or editing or processing to the management terminal based on content information of MM information held by the receiving terminal itself;

the management terminal requests searching or editing or processing to the sending terminal when user's condition of use is satisfied;

the sending terminal creates a searched or edited or processed result as MM information based on the request for searching or editing or processing, and returns the searched or edited or processed result to the receiving terminal;

the receiving terminal sets searching or editing or processing based on content information and instructs the management terminal to select information;

the management terminal requests searching or editing or processing and sending specified MM information to the sending terminal when user's condition of use and a transfer condition of the specified MM information are checked and the conditions are satisfied;

the sending terminal searches or edits or processes and obtains the specified MM information from a database and sends the specified MM information to the receiving terminal in accordance with the request; and the receiving terminal receives the specified MM information;

when the receiving terminal is not launched for a predetermined period of time from a date or time when MM information is transferred, automatically launching the receiving terminal and detecting MM information which has not been manipulated by a user yet;

structure for extracting behavior information of the detected MM information;

structure for deleting first content information, which is transferred first and left for a first predetermined period of time or more, from the content information of the MM information based on stored days or time of each content information included in the extracted behavior information; and structure for deleting second content information left for a second predetermined period of time longer than the first predetermined period of time from the content information of the MM information.

24. A multimedia information system according to claim 23, wherein the transfer system includes:
a first shared transfer system for transferring MM information; and
a second shared transfer system for mainly transferring and receiving a control signal.

* * * * *